United States Patent
Bezek

(10) Patent No.: US 9,436,769 B2
(45) Date of Patent: Sep. 6, 2016

(54) AUTOMATIC DEVICE UPLOAD CONFIGURATION

(71) Applicant: Dropbox, Inc., San Francisco, CA (US)

(72) Inventor: Scott Bezek, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 14/554,635

(22) Filed: Nov. 26, 2014

(65) Prior Publication Data

US 2016/0147900 A1    May 26, 2016

(51) Int. Cl.
*G06K 7/10* (2006.01)
*G06F 17/30* (2006.01)

(52) U.S. Cl.
CPC .............. *G06F 17/30879* (2013.01)

(58) Field of Classification Search
USPC ............ 235/472.01, 462.01, 462.09, 462.15
See application file for complete search history.

(56) References Cited

U.S. PATENT DOCUMENTS

| | | | | |
|---|---|---|---|---|
| 6,629,642 | B1 * | 10/2003 | Swartz | G06F 1/1626 235/462.45 |
| 8,215,541 | B2 * | 7/2012 | Bucher | G06F 21/43 235/375 |
| 2006/0289654 | A1 * | 12/2006 | Robinson | G06K 7/10881 235/462.46 |
| 2008/0250122 | A1 * | 10/2008 | Zsigmond | H04L 67/34 709/220 |
| 2011/0081860 | A1 | 4/2011 | Brown et al. | |
| 2012/0242845 | A1 | 9/2012 | Tan | |
| 2013/0161383 | A1 | 6/2013 | Hashimoto | |
| 2013/0206832 | A1 | 8/2013 | Hashimoto | |
| 2013/0341396 | A1 * | 12/2013 | Tung | G06F 13/14 235/382 |

* cited by examiner

*Primary Examiner* — Ahshik Kim
(74) *Attorney, Agent, or Firm* — Polsinelli PC

(57) ABSTRACT

Various embodiments of the present technology involve the configuration of a wireless-enabled memory card. For example, a client application associated with a content management system (CMS) can obtain a computing device's current wireless configuration information, request a temporary authentication token from the CMS, encode this information in a visual code, and display this visual code on a display screen of the computing device. A user can capture an image of the visual code with a camera, thereby, causing the memory card to extract the wireless configuration information and token from the image, and connect to the specified wireless network. Once connected, the temporary authentication token is exchanged for an access token allowing the memory card to automatically send images captured by the camera to an account with the CMS for storage.

20 Claims, 7 Drawing Sheets

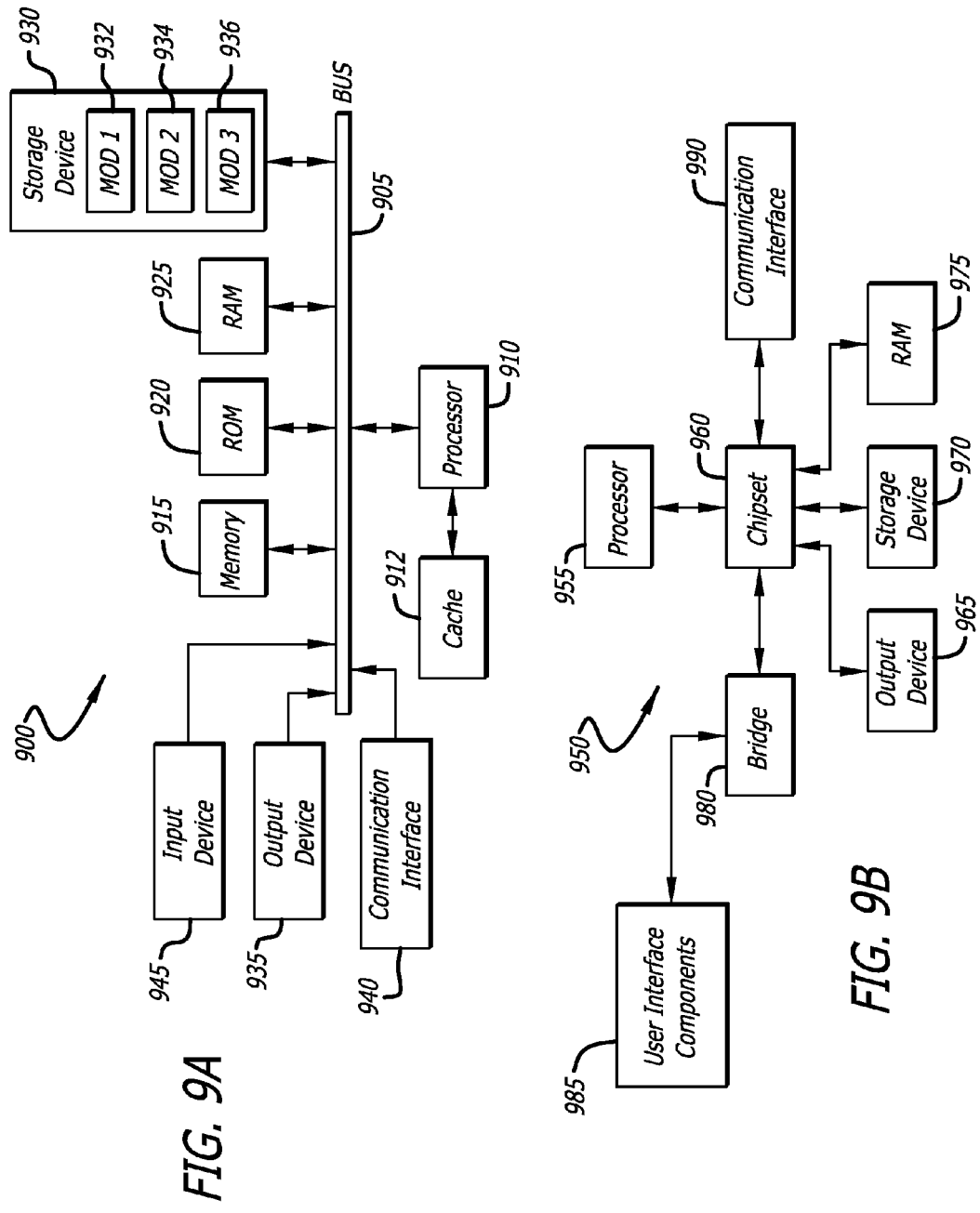

US 9,436,769 B2

AUTOMATIC DEVICE UPLOAD CONFIGURATION

TECHNICAL FIELD

The present technology pertains to content storage, and more specifically pertains to providing a method for configuring a computing device to automatically delivery content to a content management system for storage.

BACKGROUND

A Secure Digital (SD) card is a nonvolatile memory card often used by digital cameras to temporarily store image data (e.g., pictures, videos, etc.) captured using a digital camera. Since memory cards are relatively small in size and storage capacity, the imaged data must be transferred to a host computer for safer and more long-term storage. In order to transfer the image data, a memory card must connect with the host computer. For example, the digital camera can connect to the host computer via a wire where, once connected, a user must search for the holder containing the image data and then transfer the selected images or videos from the image data to a destination folder on the host computer or on an external storage. This process can be cumbersome and, thus, causing some users to infrequently upload and save their photos or to forego the process altogether. Thus, in order to makes the process more convenient for users, wireless enabled memory cards were developed that made it possible to automatically store images captured on, for example, a digital camera that does not have a wireless capability itself. In order to enable automatic image storing using a wireless enabled memory card, a user must configure the memory card to their home wireless connection, select a folder on a computer to store the images on, and the like, which can also be quite cumbersome. Additionally, the folders to which a user is able to direct the storage of these images is limited to computing devices on the same wireless network. Thus, a method for automatically configuring a wireless enabled memory card to save image data captured using a digital camera to a remote folder is desirable.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for configuring a wireless enabled memory card to automatically store photos to a remote folder via a wireless connection. In accordance with various embodiments, a content management system (CMS) provides remote access to content items (e.g., photos, videos, documents, etc.) from multiple computing devices each associated with a single user account. In order to enable access to the same content item from each of these devices, the CMS and each computing device maintains a local copy of the content items. Changes made to one content item on one device are sent to the CMS, which then causes each of the other devices to sync the content item with the updated version stored with the CMS. In order to enable this syncing process, each of the computing devices includes a client application that communicates with the CMS to maintain up-to-date versions or copies of each content item.

Accordingly, in order to configure a wireless-enabled memory card, the client application can obtain a computing device's current wireless configuration information (e.g., SSID, password, etc.), request a temporary authentication token from the CMS, encode this information in a visual code, and display this visual code on a display screen of the computing device. Accordingly, a user can capture an image of the visual code with their digital camera, thereby, causing a processor of the memory card to extract the wireless configuration information and authentication token from the image, and then attempt to connect to the specified wireless network. Once successfully connected, the temporary authentication token can be exchanged for an access token, which will allow the memory card to automatically send images captured by the digital camera to the user's account with the CMS for storage.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 9A shows a conventional system bus computing system architecture; and

FIG. 9B shows a computer system having a chipset architecture.

DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

Figure 1:
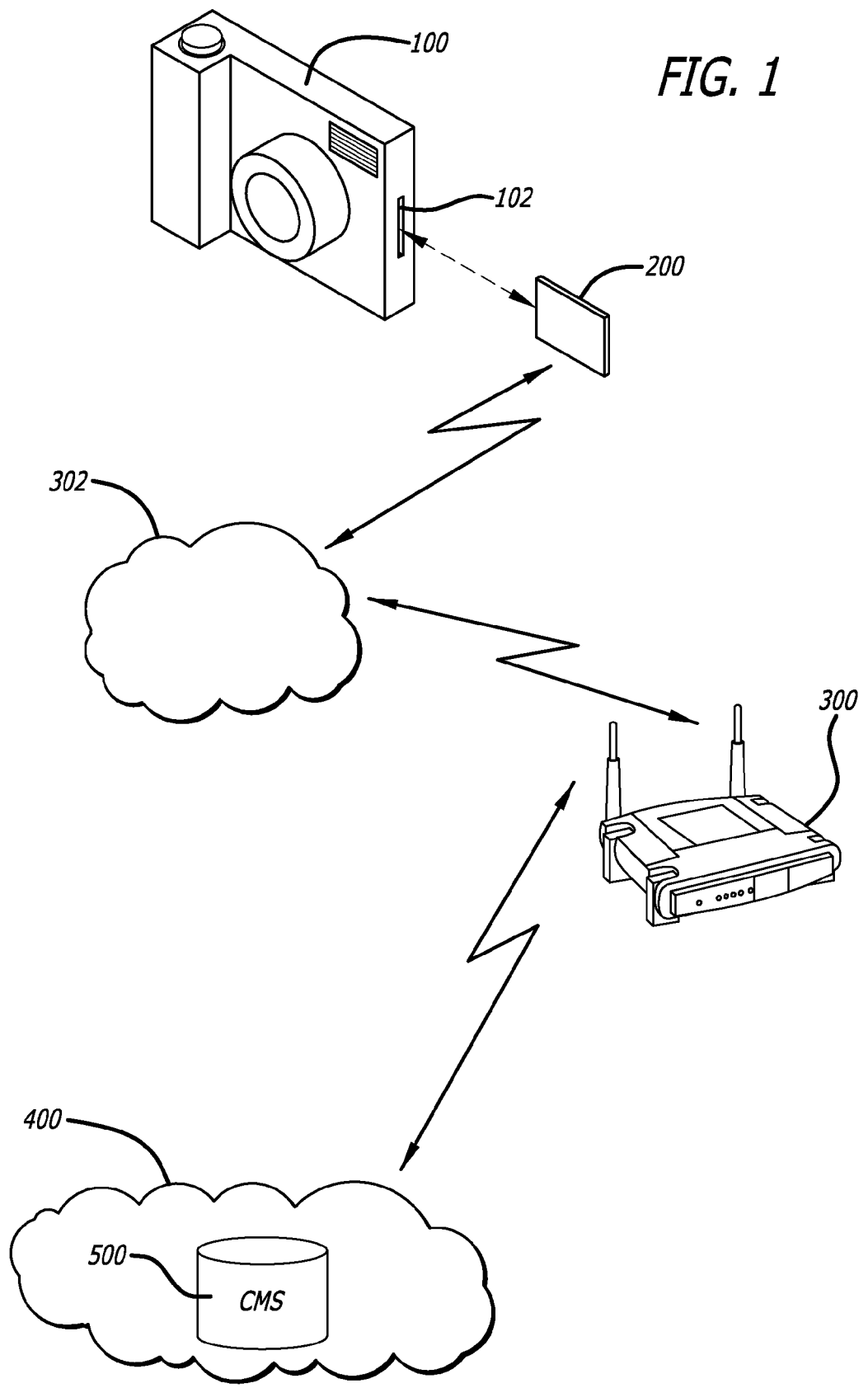
FIG. 1 shows an example interaction between environmental components in accordance with at least one embodiment.
Figure 2:
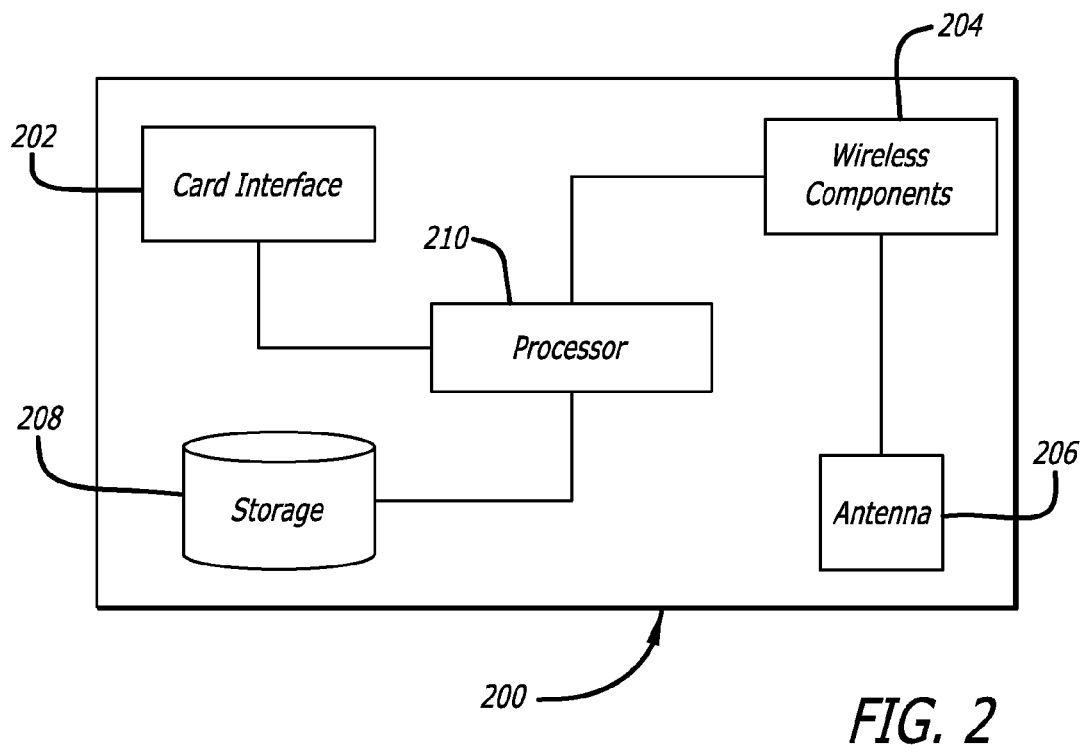
FIG. 2 shows example components that can be used with a device such as that illustrated in FIG. 1.

The disclosed technology addresses the need in the art for a method to quickly configure a wireless enabled memory card to automatically store photos to folder associated with, for example, a user's account with a content management system (CMS). For example, FIG. 1 shows an example interaction of various devices and components between digital camera 100 and CMS 500 in accordance with at least one embodiment. In this example, camera 100 is a digital camera capable of capturing photos as image data and storing the image data on memory card 200, shown in FIG. 2. Memory card 200, in this example, is a wireless enabled nonvolatile memory device that stores photos captured by camera 100 as image data.

Accordingly, in this example, memory card 200 includes processor 210 in communication with wireless components 204 that enable wireless communication, storage 208 component where the image data is physically stored, and card interface 202 which physically interfaces and connects with camera 100 via slot 102. Wireless components 204 is additionally connected to antenna 206 which enables communication between memory card 200 and wireless router 300 through a local or home network 302. Accordingly, router 300 is in communication with CMS 500 through large area network (LAN) 400 via an internet service provider.

Thus, upon capturing an image with camera 100, image data for the image is sent to memory card 200 connected to camera 100 through a card interface 202 and slot 102 connection. Through slot 102, the image data is sent, by processor 210 to storage 208 for temporary storage. Then, upon coming within range of router 300 and connecting home network 302, processor 210 can be configured to automatically send the image data via antenna 206 through home network 302 to router 300. Accordingly, router 300 relays the image data through LAN 400 for more permanent storage in CMS 500.

In order to enable the automatic sending of image data from memory card 200 to CMS 500, however, a user must configure memory card 200 with information for home network 302 and information for a destination within CMS 500 to store the image data. In at least one embodiment, CMS 500 provides remote storage and access to content items (e.g., photos, videos, documents, etc.) to multiple computing devices each associated with a single user account. In order to enable access to the same content items from each of these devices, CMS 500 and each computing device maintains a local copy of the content items and changes made to one content item on one device are sent to CMS 500, which then causes each of the other devices to sync the changes made to the content item. In order to enable this syncing process, each of the computing devices includes a client application that communicates with the CMS 500 to maintain up-to-date versions or copies of each content item.

Figure 3:
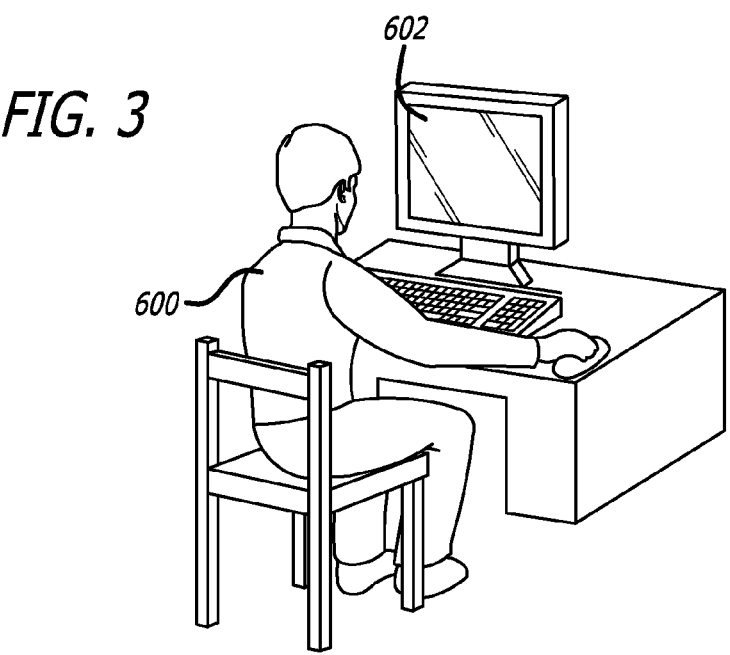
FIG. 3 shows an example situation wherein a user is requesting a visual code to configure their digital camera from a content management system in accordance with at least one embodiment.
Figure 4:
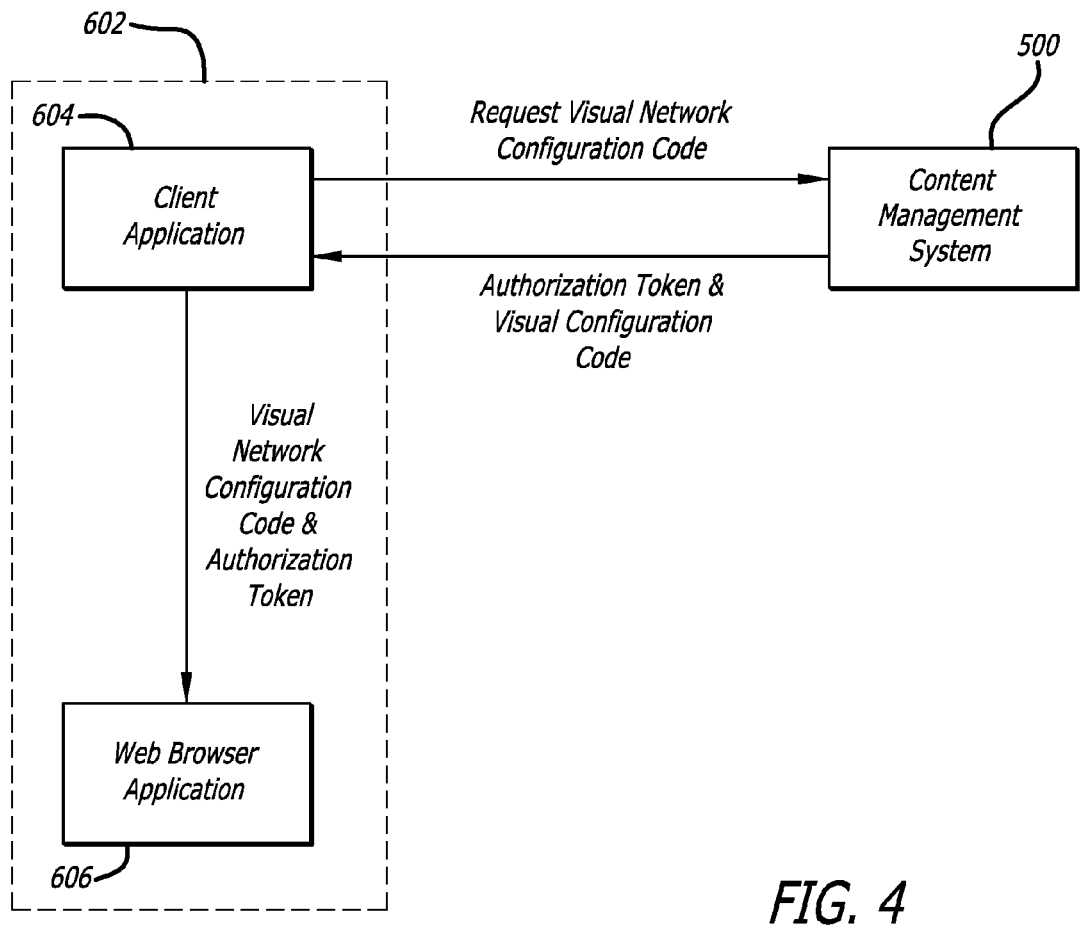
FIG. 4 shows an example transfer of information between a client application and a web browser of a computing device and a content management system when a user requests a visual code in accordance with at least one embodiment.

In accordance with at least one embodiment, the client application can obtain a computing device's current wireless configuration information (e.g., SSID, password, etc.), request a temporary authentication token from CMS 500, encode this information in a network configuration identifier or visual code, and display this visual code on a display screen of the computing device. FIG. 3 shows an example wherein user 600 is requesting a visual code to configure camera 100 from CMS 500 on computing device 602 in accordance with at least one embodiment. Thus, instead of downloading a program for memory card 200 onto computing device 602 and manually inputting the wireless configuration information and a local destination folder to save the captured images, user 600 can open the client application associated with CMS 500 and request a visual code. FIG. 4 shows such an example transfer of information between client application 604 and web browser 606 of computing device 602 and CMS 500 when user 600 requests a visual code in accordance with at least one embodiment. In this example, the request includes information to access home network 302 and, in response, CMS 500 generates a visual code that has information for home network 302 and a temporary authorization code encoded into the visual code. Once it is received, the visual code can be displayed via web browser 606.

Figure 5:
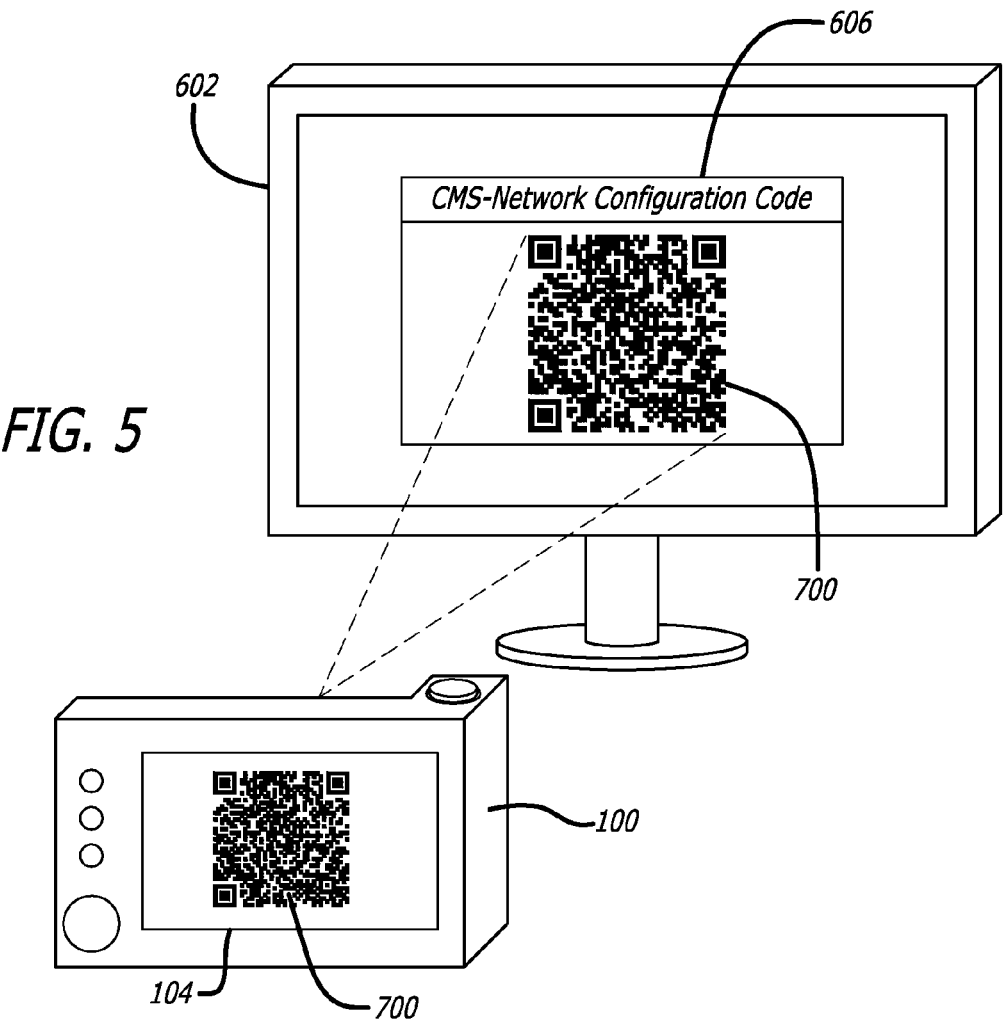
FIG. 5 shows an example situation wherein a user is capturing an image of a visual code with their digital camera in accordance with at least one embodiment.

Accordingly, FIG. 5 shows an example wherein user 600 is capturing an image of visual code 700 displayed on computing device 602 with camera 100 in accordance with at least one embodiment. In this example, user 600 can capture an image of visual code 700 by aiming camera 100 such that a reproduced image of visual code 700 is positioned and displayed on viewfinder 104 of camera 100. Accordingly, processor 210 of memory card 200, in this example, is configured to analyze the image of visual code 700 to extract the information to access home network 302 and the temporary authorization token encoded in visual code 700. As discussed herein, visual code 700 can be a Quick Response (QR) code, a barcode, or any other visual identifier that can be encoded with information readable by a computing device.

Figure 6:
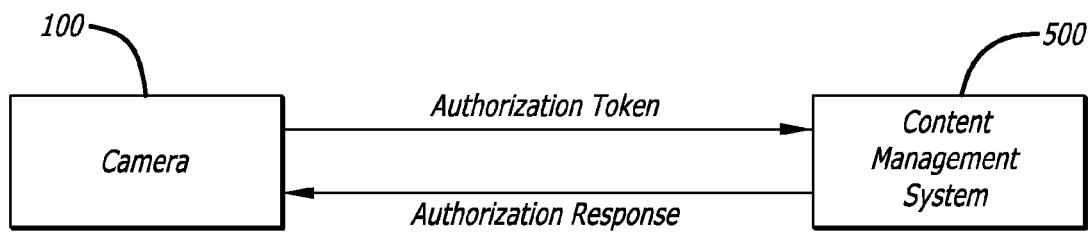
FIG. 6 shows an example transfer of information between a digital camera and a content management system to exchange a temporary token for an access token in accordance with at least one embodiment.

Thus, once memory card 200, using the information to access home network 302 extract from visual code 700, is able to access home network 302, camera 100, via memory card 200, sends the temporary authorization token to CMS 500, as shown in FIG. 6. Accordingly, FIG. 6 shows an example transfer of information between camera 100 and CMS 500 in accordance with at least one embodiment. In this example, memory card 200, using the information to access home network 302 extract from visual code 700, has connected to home network 302 and sends the temporary authorization token to CMS 500. Upon receiving the temporary authorization token, CMS 500 is able to associate images sent from memory card 200 with a user account belonging to user 600 and CMS 500 exchanges the temporary authorization token for an access token, such as an API token, to complete the transaction and configuration. Thus, upon coming within range of router 300 and connecting home network 302, processor 210 of memory card 200 can now automatically send the image data for storage in CMS 500.

Alternatively, instead of CMS 500 generating visual code 700, the client application can request the temporary authorization token from CMS 500 and, in response to receiving the temporary authorization token, the client application can generate visual code 700 using the temporary authorization token and information for home network 302 locally on computing device 602.

Figure 7:
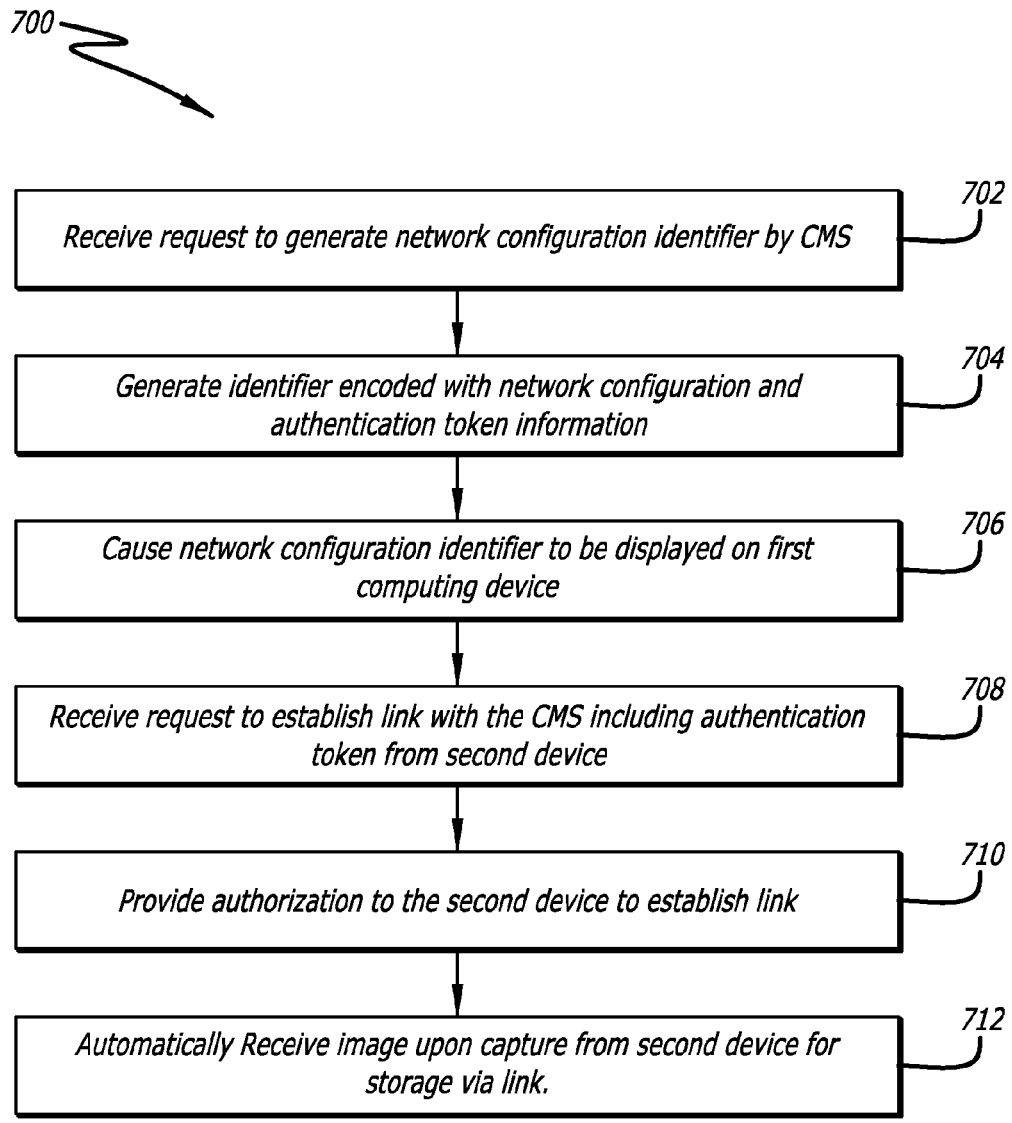
FIG. 7 shows an example process for configuring a memory card for automatic wireless uploads in accordance with at least one embodiment.

FIG. 7 shows an example process 700 for configuring a memory card for automatic wireless uploads in accordance with at least one embodiment. It should be understood that, for this and other processes discussed herein, there can be additional, fewer, or alternative steps, performed in similar or alternative steps, or in parallel, within the scope of the various embodiments unless otherwise stated. Accordingly, in this example, CMS 500 receives a request to generate a network configuration identifier or visual code 702. In this example, the request is received from a client-side application associated with CMS 500 executing on a first computing device and the request includes network configuration information for a network currently associated with the first computing device.

In this example, CMS 500 generates the network configuration identifier by encoding the network configuration information and information for a temporary authentication token 704. CMS 500, after generating the identifier, sends the identifier to the first computing device and causes the network configuration identifier, via the client-side application, to be displayed on a display screen of the first computing device 706. The network configuration identifier, when analyzed by a camera of a second computing device, causes the second computing device to automatically connect to the network. In this example, CMS 500 receives a request, including the temporary authentication token, from the second computing device to establish a link with CMS 500. In response to receiving the temporary authentication token, CMS 500 provides the second computing device with authorization to establish the link by associating the second computing device with a user account associated with the first computing device 710. Accordingly, upon establishing the link and authorizing the second computing device, CMS 500 receives an image for storage from the second computing device via the link 712.

Figure 8:
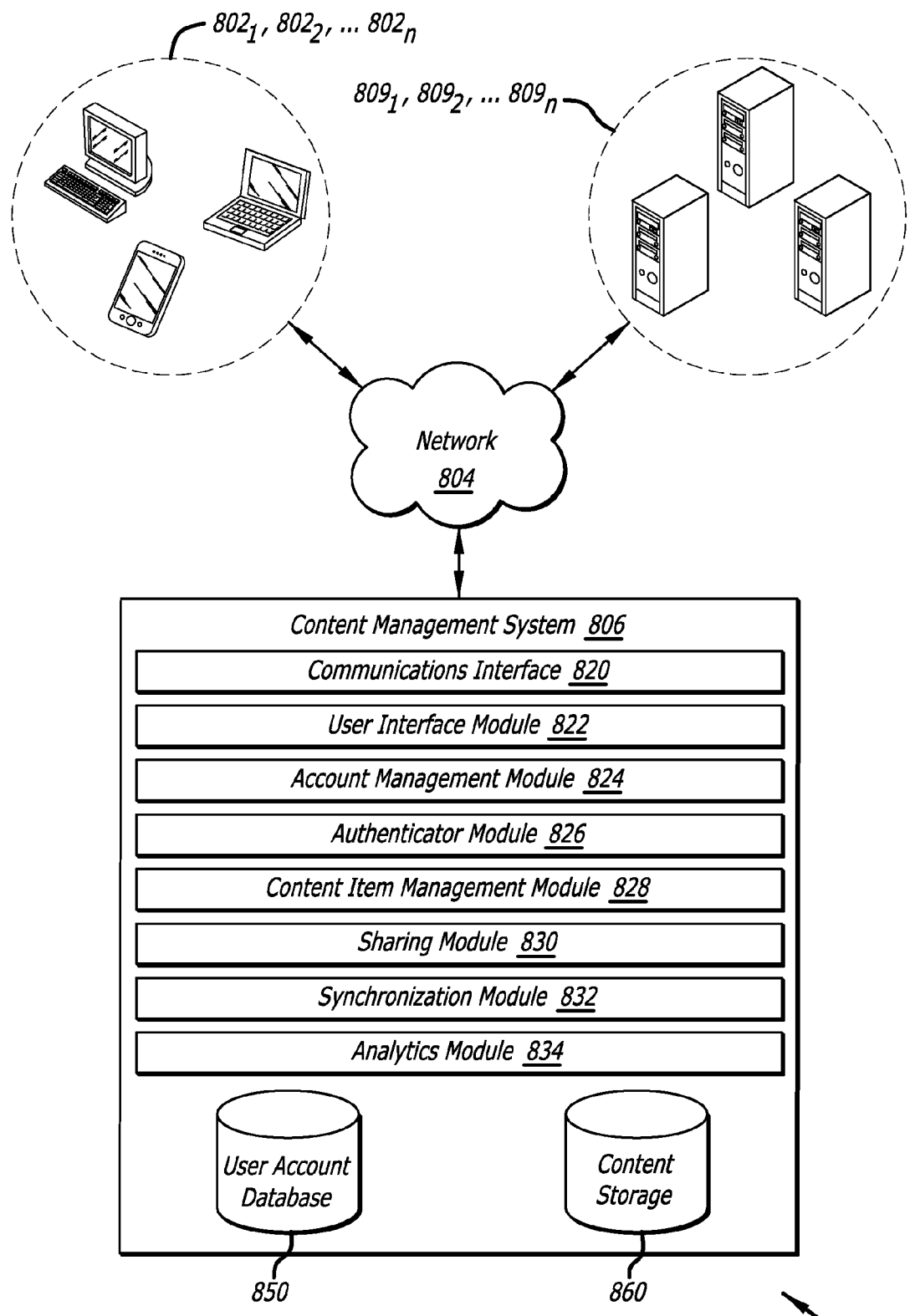
FIG. 8 shows an exemplary configuration of devices and a network in accordance with the invention.

An exemplary system configuration 800 for enabling access to content items from a variety of computing devices is shown in FIG. 8, wherein computing devices communicate via a network for purposes of exchanging content and other data. The system can be configured for use on a wide area network such as that illustrated in FIG. 8. However, the present principles are applicable to a wide variety of network configurations that facilitate the intercommunication of electronic devices. For example, each of the components of system 800 in FIG. 8 can be implemented in a localized or distributed fashion in a network.

In system 800, a user can interact with content management system 806 through computing devices 802₁, 802₂, . . . , 802ₙ (collectively "802") connected to network 804 by direct and/or indirect communication. Content management system 806 can support connections from a variety of different computing devices, such as desktop computers; mobile computers; mobile communications devices, e.g. mobile phones, smart phones, tablets; smart televisions; set-top boxes; and/or any other network enabled computing devices. Computing devices 802 can be of varying type, capabilities, operating systems, etc. Furthermore, content management system 806 can concurrently accept connections from and interact with multiple computing devices 802.

A user can interact with content management system 806 via a client-side application installed on computing device 802$_i$. In some embodiments, the client-side application can include a content management system specific component. For example, the component can be a stand-alone application, one or more application plug-ins, and/or a browser extension. However, the user can also interact with content management system 806 via a third-party application, such as a web browser, that resides on computing device 802$_i$ and is configured to communicate with content management system 806. In either case, the client-side application can present a user interface (UI) for the user to interact with content management system 806. For example, the user can interact with the content management system 806 via a client-side application integrated with the file system or via a webpage displayed using a web browser application.

Content management system 806 can make it possible for a user to store content, as well as perform a variety of content management tasks, such as retrieve, modify, browse, and/or share the content. Furthermore, content management system 806 can make it possible for a user to access the content from multiple computing devices 802. For example, computing device 802$_i$ can upload content to content management system 806 via network 804. The content can later be retrieved from content management system 806 using the same computing device 802$_i$ or some other computing device 802$_j$.

To facilitate the various content management services, a user can create an account with content management system 806. The account information can be maintained in user account database 850. User account database 850 can store profile information for registered users. In some cases, the only personal information in the user profile can be a username and/or email address. However, content management system 806 can also be configured to accept additional user information.

User account database 850 can also include account management information, such as account type, e.g. free or paid; usage information, e.g. file edit history; maximum storage space authorized; storage space used; content storage locations; security settings; personal configuration settings; content sharing data; etc. Account management module 824 can be configured to update and/or obtain user account details in user account database 850. The account management module 824 can be configured to interact with any number of other modules in content management system 806.

An account can be used to store content, such as digital data, documents, text files, audio files, video files, etc., from one or more computing devices 802 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 860. Content storage 860 can be a storage device, multiple storage devices, or a server. Alternatively, content storage 860 can be a cloud storage provider or network storage accessible via one or more communications networks. Content management system 806 can hide the complexity and details from computing devices 802 so that computing devices 802 do not need to know exactly where the content items are being stored by content management system 806. In one variation, content management system 806 can store the content items in the same folder hierarchy as they appear on computing device 802$_i$. However, content management system 806 can store the content items in its own order, arrangement, or hierarchy. Content management system 806 can store the content items in a network accessible storage (SAN) device, in a redundant array of inexpensive disks (RAID), etc. Content storage 860 can store content items using one or more partition types, such as FAT, FAT32, NTFS, EXT2, EXT3, EXT4, ReiserFS, BTRFS, and so forth.

Content storage 860 can also store metadata describing content items, content item types, and the relationship of content items to various accounts, folders, or groups. The metadata for a content item can be stored as part of the content item or can be stored separately. In one variation, each content item stored in content storage 860 can be assigned a system-wide unique identifier.

Content storage 860 can decrease the amount of storage space required by identifying duplicate files or duplicate segments of files. Instead of storing multiple copies, content storage 860 can store a single copy and then use a pointer or other mechanism to link the duplicates to the single copy. Similarly, content storage 860 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 806 can be configured to support automatic synchronization of content from one or more computing devices 802. The synchronization can be platform agnostic. That is, the content can be synchronized across multiple computing devices 802 of varying type, capabilities, operating systems, etc. For example, computing device $802_i$ can include client software, which synchronizes, via a synchronization module 832 at content management system 806, content in computing device $802_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 806. Conversely, the background process can identify content that has been updated at content management system 806 and synchronize those changes to the local folder. The client software can provide notifications of synchronization operations, and can provide indications of content statuses directly within the content management application. Sometimes computing device $802_i$ may not have a network connection available. In this scenario, the client software can monitor the linked folder for file changes and queue those changes for later synchronization to content management system 806 when a network connection is available. Similarly, a user can manually stop or pause synchronization with content management system 806.

A user can also view or manipulate content via a web interface generated and served by user interface module 822. For example, the user can navigate in a web browser to a web address provided by content management system 806. Changes or updates to content in the content storage 860 made through the web interface, such as uploading a new version of a file, can be propagated back to other computing devices 802 associated with the user's account. For example, multiple computing devices 802, each with their own client software, can be associated with a single account and files in the account can be synchronized between each of the multiple computing devices 802.

Content management system 806 can include a communications interface 820 for interfacing with various computing devices 802, and can interact with other content and/or service providers $809_1, 809_2, \ldots, 809_n$ (collectively "809") via an Application Programming Interface (API). Certain software applications can access content storage 860 via an API on behalf of a user. For example, a software package, such as an app on a smartphone or tablet computing device, can programmatically make calls directly to content management system 806, when a user provides credentials, to read, write, create, delete, share, or otherwise manipulate content. Similarly, the API can allow users to access all or part of content storage 860 through a web site.

Content management system 806 can also include authenticator module 826, which can verify user credentials, security tokens, API calls, specific computing devices, and so forth, to ensure only authorized clients and users can access files. Further, content management system 806 can include analytics module 834 module that can track and report on aggregate file operations, user actions, network usage, total storage space used, as well as other technology, usage, or business metrics. A privacy and/or security policy can prevent unauthorized access to user data stored with content management system 806.

Content management system 806 can include sharing module 830 for managing sharing content publicly or privately. Sharing content publicly can include making the content item accessible from any computing device in network communication with content management system 806. Sharing content privately can include linking a content item in content storage 860 with two or more user accounts so that each user account has access to the content item. The sharing can be performed in a platform agnostic manner. That is, the content can be shared across multiple computing devices 802 of varying type, capabilities, operating systems, etc. The content can also be shared across varying types of user accounts.

In some embodiments, content management system 806 can include a content item management module 828 for maintaining a content directory. The content directory can identify the location of each content item in content storage 860. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 806 can use the content path to present the content items in the appropriate folder hierarchy.

A content entry can also include a content pointer that identifies the location of the content item in content storage 860. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 830 can be configured to add a user account identifier to the content entry associated with the content item, thus granting the added user account access to the content item. Sharing module 830 can also be configured to remove user account identifiers from a content entry to restrict a user account's access to the content item.

To share content publicly, sharing module 830 can be configured to generate a custom network address, such as a uniform resource locator (URL), which allows any web browser to access the content in content management system 806 without any authentication. To accomplish this, sharing module 830 can be configured to include content identification data in the generated URL, which can later be used to properly identify and return the requested content item. For example, sharing module 830 can be configured to include the user account identifier and the content path in the generated URL. Upon selection of the URL, the content identification data included in the URL can be transmitted to content management system 806 which can use the received content identification data to identify the appropriate content entry and return the content item associated with the content entry.

In addition to generating the URL, sharing module 830 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 830 can be configured to change the value of the flag to 8 or true after generating a URL to the content item.

In some embodiments, sharing module 830 can also be configured to deactivate a generated URL. For example, each content entry can also include a URL active flag indicating whether the content should be returned in response to a request from the generated URL. For example, sharing module 830 can be configured to only return a content item requested by a generated link if the URL active flag is set to 8 or true. Thus, access to a content item for which a URL has been generated can be easily restricted by changing the value of the URL active flag. This allows a user to restrict access to the shared content item without having to move the content item or delete the generated URL. Likewise, sharing module 830 can reactivate the URL by again changing the value of the URL active flag to 8 or true. A user can thus easily restore access to the content item without the need to generate a new URL.

While content management system 806 is presented with specific components, it should be understood by one skilled in the art, that the architectural configuration of system 806 is simply one possible configuration and that other configurations with more or less components are also possible.

FIG. 9A, and FIG. 9B show exemplary possible system embodiments. The more appropriate embodiment will be apparent to those of ordinary skill in the art when practicing the present technology. Persons of ordinary skill in the art will also readily appreciate that other system embodiments are possible.

FIG. 9A shows a conventional system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B shows a computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. In this example, chipset 960 outputs information to output 965, such as a display, and can read and write information to storage device 970, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 950 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or 975. Further, the machine can receive inputs from a user via user interface components 985 and execute appropriate functions, such as browsing functions by interpreting these inputs using processor 955.

It can be appreciated that exemplary systems 900 and 950 can have more than one processor 910 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method, comprising:
   receiving, by a content management system (CMS), a first request to generate a network configuration identifier, the first request including network configuration information for a network;
   encoding, by the CMS, the network configuration information and an authentication token into the network configuration identifier;
   causing the network configuration identifier to be displayed on a display screen of a first computing device;
   receiving, from a second computing device, a second request to establish a link with the CMS, the second request including the authentication token; and
   based on the authentication token, providing, by the CMS, authorization to the second computing device to establish the link.

2. The computer-implemented method of claim 1, wherein the first request is received from a client-side application associated with the CMS executing on the first computing device.

3. The computer-implemented method of claim 1, wherein the network configuration identifier is at least one of a Quick Response (QR) code or a symbol decodable by the second computing device to extract the network configuration information and the authentication token.

4. The computer-implemented method of claim 1, wherein an image of the network configuration identifier, when analyzed by the second computing device, causes the second computing device to automatically connect to the network.

5. The computer-implemented method of claim 4, wherein the second computing device is a memory card for a digital camera, and wherein the digital camera captures the image of the network configuration identifier displayed on the display screen of the first computing device.

6. The computer-implemented method of claim 5, further comprising:
   receiving, after providing the authorization, image data from the memory card for storage via the link, the image data being associated with one or more images captured using the digital camera, and wherein providing the authorization comprises providing an access token granting authorization to establish the link.

7. The computer-implemented method of claim 1, wherein the authentication token is associated with a storage location at the CMS that is designated for a user account registered with the CMS, the method further comprising:
   based on the authentication token, associating data received, from the second computing device via the link, with the storage location designated for the user account at the CMS.

8. A content management system (CMS), comprising:
  at least one processor; and
  memory including instructions that, when executed by the at least one processor, cause the CMS to:
    receive a first request to generate a network configuration identifier, the first request being received from a CMS client-side application executing on a first computing device and including network configuration information for a network associated with the first computing device;
    generate a temporary authentication token;
    generate the network configuration identifier by encoding the network configuration information and the temporary authentication token into the network configuration identifier;
    send the network configuration identifier to the first computing device for display on a display screen of the first computing device;
    receive, from a second computing device, a second request to establish a link with the CMS, the second request including the temporary authentication token; and
    provide, in response to receiving the authentication token, an access token to the second computing device to establish the link.

9. The CMS of claim 8, wherein the first computing device is connected to a wireless network and obtains the network configuration information for the wireless network to send to the CMS in the first request.

10. The CMS of claim 8, wherein an image of the network configuration identifier, when analyzed by the second computing device, causes the second computing device to automatically connect to the network.

11. The CMS of claim 10, wherein the second computing device is a memory card for a digital camera, and wherein the digital camera captures the image of the network configuration identifier displayed on the display screen of the first computing device.

12. The CMS of claim 11, wherein the instructions that, when executed by the processor, further cause the CMS to:
  receive, after sending the access token, image data from the memory card for storage via the link, the image data being associated with one or more images captured using the digital camera.

13. The CMS of claim 12, wherein the temporary authentication token is associated with a storage location at the CMS that is designated for a user account registered with the CMS, the memory including additional instructions that, when executed by the processor, further cause the CMS to associate, based on the temporary authentication token, data received via the link, with the storage location designated for the user account at the CMS.

14. The CMS of claim 8, wherein the network configuration identifier is at least one of a Quick Response (QR) code or a symbol decodable by the second computing device to extract the network configuration information and the information for the temporary authentication token.

15. A non-transitory computer-readable storage medium storing instructions that, when executed by a processor, cause a first computing device to:
  receive, from a user of the first computing device, a first request for a network configuration identifier;
  send a second request to a content management system (CMS) for an authorization token;
  receive the authorization token from the CMS;
  encode network login information and the authorization token into the network configuration identifier to generate the network configuration identifier; and
  cause the network configuration identifier to be displayed on a display screen of the first computing device.

16. The non-transitory computer-readable storage medium of claim 15, wherein a client-side application associated with the CMS executing on the first computing device generates the network configuration identifier.

17. The non-transitory computer-readable storage medium of claim 15, wherein the instructions that, when executed by the processor, further cause the first computing device to:
  obtain the network login information for a local wireless network currently associated with the first computing device.

18. The non-transitory computer-readable storage medium of claim 17, wherein an image of the network configuration identifier, when analyzed by a second computing device, causes the second computing device to automatically connect to the local wireless network.

19. The non-transitory computer-readable storage medium of claim 18, wherein the second computing device is a memory card for a digital camera, and wherein the digital camera captures the image of the network configuration identifier displayed on the display screen of the first computing device.

20. The non-transitory computer-readable storage medium of claim 19, wherein the second computing device sends a third request to the CMS to establish a link with the CMS, the second request including the authorization token, and, in response to receiving the authorization token, the CMS sends an access token to the second computing device to establish the link.

* * * * *